United States Patent [19]

Eschbach

[11] Patent Number: 5,535,019
[45] Date of Patent: Jul. 9, 1996

[54] ERROR DIFFUSION HALFTONING WITH HOMOGENEOUS RESPONSE IN HIGH/LOW INTENSITY IMAGE REGIONS

[75] Inventor: Reiner Eschbach, Webster, N.Y.

[73] Assignee: Xerox Corporation, Stamford, Conn.

[21] Appl. No.: 306,299

[22] Filed: Sep. 15, 1994

[51] Int. Cl.$^6$ .................................................... H04N 1/40
[52] U.S. Cl. .......................... 358/456; 358/455; 358/465; 358/466; 382/270; 382/274
[58] Field of Search ..................................... 358/466, 456, 358/455, 443, 465, 433; 382/270, 271, 272, 273, 274

[56] References Cited

U.S. PATENT DOCUMENTS

| | | | |
|---|---|---|---|
| 4,149,194 | 4/1979 | Holladay | 358/283 |
| 4,339,774 | 7/1982 | Temple | 358/283 |
| 4,924,322 | 5/1990 | Kurosawa et al. | 358/448 |
| 4,955,065 | 9/1990 | Ulichney | 382/50 |
| 5,045,952 | 9/1991 | Eschbach | 358/447 |
| 5,055,942 | 10/1991 | Levien | 358/456 |
| 5,226,094 | 7/1993 | Eschbach | 382/41 |
| 5,296,940 | 3/1994 | Kawashima | 382/273 |
| 5,307,425 | 4/1994 | Otsuka | 358/466 |
| 5,315,405 | 5/1994 | Okuwaki | 382/270 |
| 5,325,211 | 6/1994 | Eschbach | 358/466 |
| 5,351,313 | 9/1994 | Bessho et al. | 358/466 |
| 5,359,433 | 10/1994 | Nagase et al. | 358/466 |
| 5,402,506 | 3/1995 | Schafer | 382/270 |

FOREIGN PATENT DOCUMENTS 4-328957  1/1992  Japan .

OTHER PUBLICATIONS

Floyd and Steinberg, "An Adaptive Algorithm for Spatial Greyscale", Proceedings of the SID 17/2, 75-77, (1976).
Jarvis et al., "A Survey of Techniques for the Display of continuous Tone Pictures on Bilevel Displays", Computer Graphics and Image Processing, vol. 5, pp. 13–40, (1976).
Stucki, "MECCA—A Multiple-Error Correction Computation Algorithm for Bi-Level Image Hardcopy Reproduction", IBM Res. Rep. RZ1060, (1981).
Robert Ulichney, "Digital Halftoning", MIT Press 1987, p. 241.
Eschbach, R., "Reduction of Artifacts in Error Diffusion by Means of Imput-Dependent Weights", Journal of Electronic Imaging, vol. 2(4), (Oct. 1993), pp. 352–358.

*Primary Examiner*—Edward L. Coles, Sr.
*Assistant Examiner*—Fan Lee
*Attorney, Agent, or Firm*—Mark Costello

[57] ABSTRACT

A method and apparatus for quantizing pixels in an image formed by a plurality of pixels, each pixel constituting an image signal representing optical density of the image at a location therein, and having an original optical density value selected from one of a set of 'c' original optical density values that has a number of members larger than a desired output set of 'd' optical density values, through a process of error diffusion. For an input image so comprised, initially, an image signal is initially modified in accordance with previously determined error. Thereafter, during the quantization step of the process, the threshold signal for quantization determination is dynamically adjusted in accordance with previous output quantization determinations to selectively control likelihood of whether the next pixel will exceed the threshold. The threshold level is selectively modified on a pixel by pixel basis to increase or decrease the likelihood that the next pixel will be quantized to one state or another state. In addition to this control, however,the increase or decrease in the threshold level is based upon a regional input intensity. With the threshold signal set as described, the modified input signal is evaluated, and an output signal that is one of d levels is determined accordingly. Subsequent to quantization, the difference between the determined output signal and the modified input signal is evaluated and stored as error, to be dispersed for addition to a preselected group of unevaluated neighboring signals.

23 Claims, 3 Drawing Sheets

FIG. 1
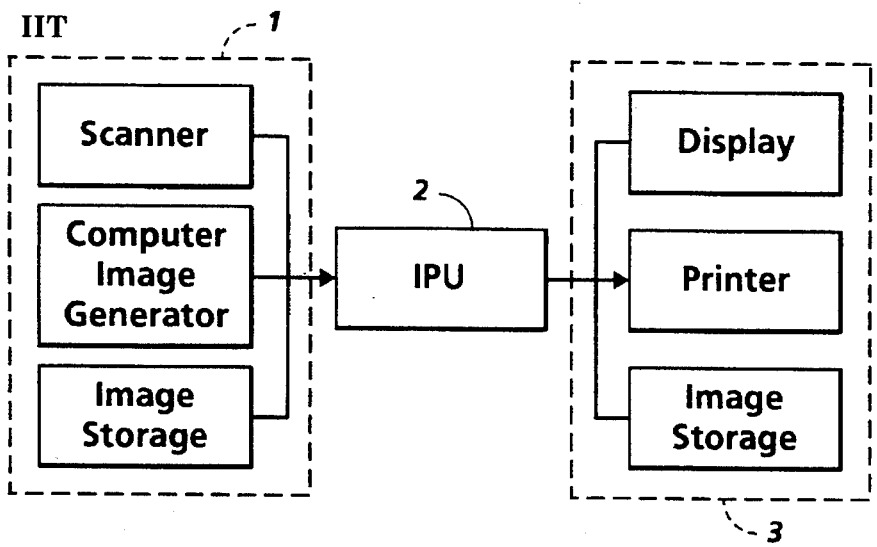
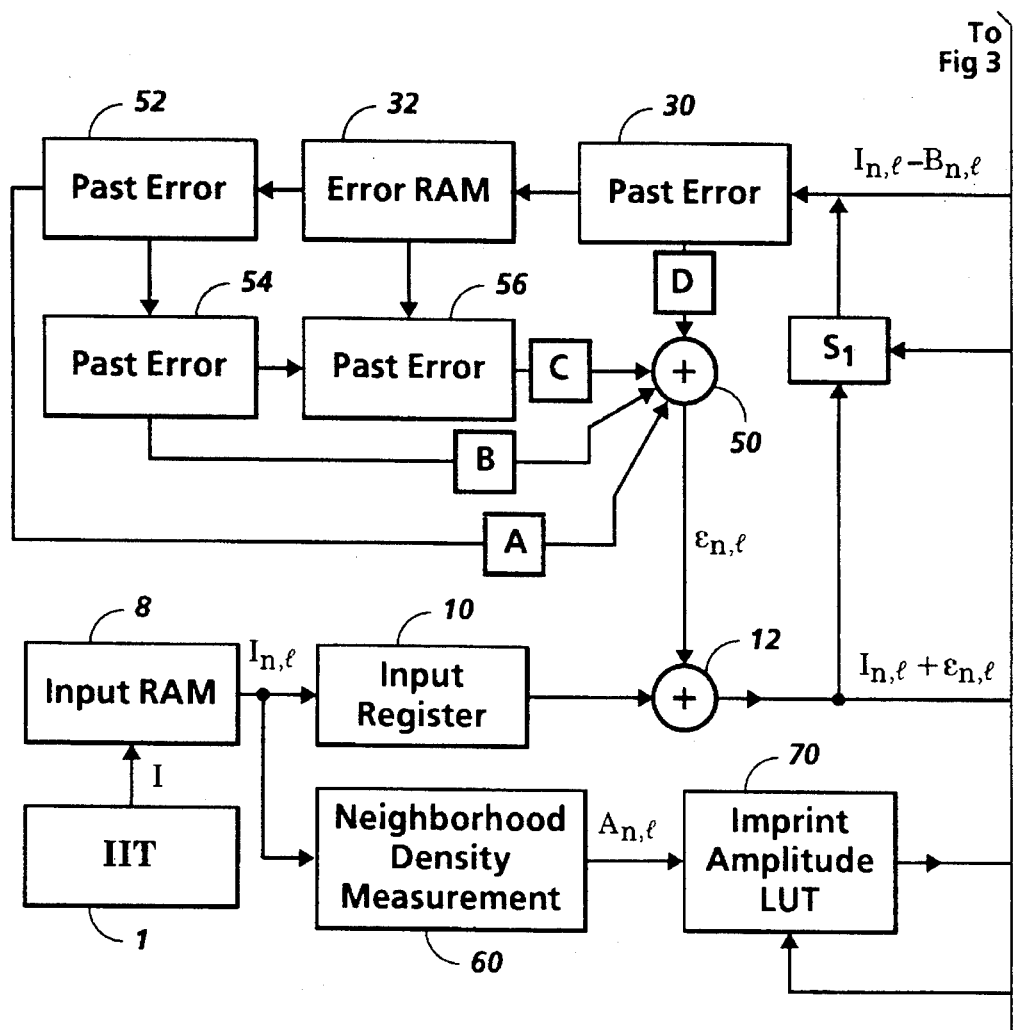
FIG. 2

ERROR DIFFUSION HALFTONING WITH HOMOGENEOUS RESPONSE IN HIGH/LOW INTENSITY IMAGE REGIONS

This invention relates to an error diffusion halftoning scheme in which the quantization process is varied to produce a homogeneous pulse distribution in low and high intensity image regions, while retaining a standard error diffusion response in midtone regions.

BACKGROUND OF THE INVENTION

Image information, be it color, black or white, is commonly generated in a bitmap format where the bitmap comprises a plurality of gray level pixels, i.e. pixels that are defined by digital values, each value representing a gray level among a number of gray levels. Thus, in an 8 bit system, 256 levels of gray are present, where each level represents an increment of gray between black and white. In the case of color bitmaps, where three defining colors or separations each include 256 levels of information, there may be more than 16 million colors defined by a gray bitmap.

Usually, bitmaps in such a gray level format are unprintable by standard printers. Standard printers print in a limited number of levels, either a spot or a no spot in the binary case, or a limited number of levels associated with the spot, for example, four in the quaternary case. Accordingly, it is necessary to reduce or quantize the gray level image data to a limited number of levels so that it is printed. Besides gray level information derived by scanning, certain processing techniques such as those described, for example, in U.S. Pat. No. 5,226,094 to Eschbach may produce gray level data requiring quantization for printing.

One standard method of quantizing gray level pixel values to binary level pixel values is through the use of dithering or halftoning processes. In such arrangements, over a given area having a number of gray pixels therein, each pixel value of an array of gray level pixels within the area is compared to one of a set of preselected thresholds (the thresholds are stored as a dither matrix and the repetitive pattern generated by this matrix is considered a halftone cell) as taught, for example, in U.S. Pat. No. 4,149,194 to Holladay. The effect of such an arrangement is that, for an area where the image is gray, some of the thresholds within the dither matrix will be exceeded, i.e. the image value at that specific location is larger than the value stored in the dither matrix for that same location, while others are not. In the binary case, the pixels or cell elements for which the thresholds are exceeded might be printed as black, while the remaining elements are allowed to remain white, dependent on the actual physical quantity described by the data. The effect of the distribution of black and white over the halftone cell is integrated by the human eye as gray. Dithering or screening presents problems, however, in that the amount of gray within an original image is not maintained exactly over an area, because the finite number of elements inside each dither matrix - and therefore halftone cell - only allows the reproduction of a finite number of gray levels, i.e. number of elements in the cell plus one, or less. The error arising from the difference between the output pixel value and the actual gray level pixel value at any particular cell is simply thrown away.

Algorithms that convert gray images to binary or other number of level images attempting to preserve the local density exist, and include among them error diffusion, as taught, for example, in "An Adaptive Algorithm for Spatial Greyscale" by Floyd and Steinberg, Proceedings of the SID 17/2, 75–77 (1976) (hereinafter, "Floyd and Steinberg"). Error diffusion attempts to maintain image density by making the conversion from gray pixels to binary or other level pixels on a pixel-by-pixel basis. The procedure examines each pixel with respect to a threshold, and the difference between the gray level pixel value and the output value is forwarded to a selected group or set of neighboring pixels, in accordance with a weighting scheme. Another, more elaborate method would be the error diffusion techniques of U.S. Pat. No. 5,045,952 to Eschbach, which serves to provide image dependent edge enhancement. Additional modifications to the error diffusion algorithm taught by Floyd and Steinberg have been proposed, e.g.: a different weighting matrix, as taught, for example, in "A Survey of Techniques for the Display of Continuous Tone Pictures on Bilevel Displays" by Jarvis et al., Computer Graphics and Image Processing, Vol. 5., pp. 13–40 (1976) (hereinafter, Jarvis), and in "MECCA—A Multiple-Error Correction Computation Algorithm for Bi-Level Image Hardcopy Reproduction" by Stucki, IBM Res. Rep. RZ1060 (1981) (hereinafter, Stucki). Modifications of the error calculation and weight allocation have been taught, for example, in U.S. patent application Ser. No. 07/672,987 (with a counterpart application published in Japan at JP-A1 4-328957), entitled "Method for Image Conversion with Application of Multiple Error Diffusion Matrices", by Eschbach, U.S. Pat. No. 4,924,322 to Kurosawa et. al., U.S. Pat. No. 4,339,774 to Temple, U.S. Pat. No. 4,955,065, to Ulichney and U.S. patent application Ser. No. 08/167,758 by Shiau et al.

U.S. Pat. No. 5,055,943 to Levien suggests a pixel based error diffusion scheme where the tendency of the individual dots to form clusters in a screened image can be varied by applying a hysteresis constant and recursion techniques known from adaptive screening, to allow adjustment of image coarseness by adjustment of the hysteresis constant. This method produces images that reproduce easier on some output devices, particularly for electrophotographic output devices, than the original error diffusion algorithm, but the images tend to have reduced sharpness or detail resolution, as compared to Floyd and Steinberg. In implementation, the Levien method uses an error diffusion process, providing a feedback response based on the output image, and particularly, dot size. However, the hysteresis function implemented to control the feedback response tends to dampen the response at edges. The present inventor described a similar arrangement improving sharpness response using both input and output feedback loops, at U.S. Pat. No. 5,325,211 to Eschbach.

Error diffusion suffers from an important drawback in the high and low intensity image regions. In these area, the pulse or printed spot distribution generated by error diffusion becomes very non-homogeneous, and artifacts (called worms) are formed. This problem is emphasized in office documents, where shadings and backgrounds often contain large homogeneous regions of constant low/high intensity, and error diffusion artifacts become unacceptable. For example, it is common in office documents to have large areas of light colors as background for dark text and vice versa. These areas will be characterized by worming.

Several approaches have been taken to reduce the error diffusion artifacts in the low and high input intensity regions. A common approach is to increase the size of the error distribution matrix as can be found in "Digital Halftoning", by Robert Ulichney, MIT Press 1987, pp. 241, and "Reduction of Artifacts in Error Diffusion Using Input Dependent Weights, by R. Eschbach, Journal of Electronic Imaging, 2, (1993) 352–358.

All of the references cited herein are incorporated by reference for their teachings.

SUMMARY OF THE INVENTION

This present invention is directed to an error diffusion halftoning scheme for the conversion of an image described at c optical density levels to an image described with d optical density levels (where c>d>1) in which the quantization process is varied to produce a homogeneous pulse distribution in low and high intensity image regions, while retaining a standard error diffusion-like response in midtone regions.

In accordance with one aspect of the invention, there is provided a method of quantizing pixels in an image formed by a plurality of pixels, each pixel constituting an image signal representing optical density of the image at a location therein, and having an original optical density value selected from one of a set of 'c' original optical density values that has a number of members larger than a desired output set of 'd' optical density values, through a process of error diffusion. In this process, 'c' and 'd' are integer values representing pixel depth. For an input image so comprised, initially, an image signal is initially modified in accordance with previously determined error. Thereafter, during the quantization step of the process, the threshold signal for quantization determination is dynamically adjusted in accordance with previous output quantization determinations to selectively control likelihood of whether the next pixel will exceed the threshold. The threshold level is selectively modified on a pixel by pixel basis to increase or decrease the likelihood that the next pixel will be quantized to one state or another state. In addition to this control, however, the increase or decrease in the threshold level is based upon a regional input intensity. With the threshold signal set as described, the modified input signals is evaluated, and an output signal that is one of d levels is determined accordingly. Subsequent to quantization, the difference between the determined output signal and the modified input signal is evaluated and an error signal is computed, to be dispersed for addition to a preselected group of unevaluated neighboring signals.

In accordance with another aspect of the invention, in order to generate the dynamically varying threshold value for the quantization process described in a two-dimensional manner, the one-dimensional imprint threshold signals for the previous scan lines are modified for use in the current scan line. The two-dimensional threshold signals is generated in accordance with a function:

threshold (m,n)=D=threshold (m,n−1)

where D is a selected dampening factor

The described invention advantageously spaces dots in a manner preventing worming in regions having characteristics for forming such artifacts.

These and other aspects of the invention will become apparent from the following descriptions to illustrate a preferred embodiment of the invention read in conjunction with the accompanying drawings in which:

FIG. 1 is a a block diagram showing a system in which the present invention may find use; and FIGS. 2 and 3 show a block diagram of an embodiment of the present invention.

Figure 3:
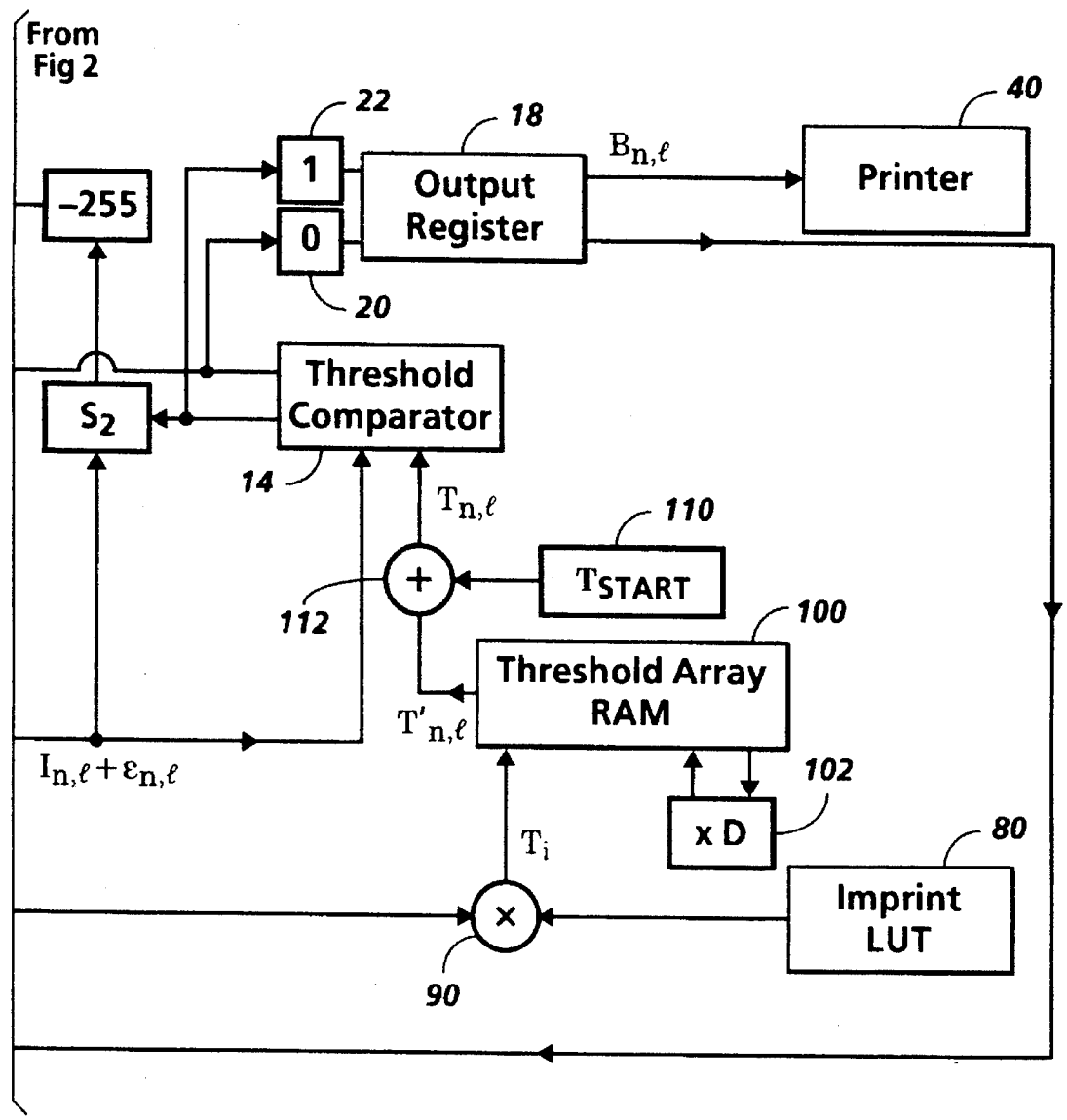

Referring now to the drawings where the showings are for the purpose of describing an embodiment of the invention and not for limiting same, a basic system for carrying out the present invention is shown in FIG. 1. In the present case, gray level image data from image input terminal (hereinafter, IIT) 1 may be characterized as image data, each pixel of which is defined at a single level or optical density in a set of 'c' optical density magnitudes or levels, the number of members in the set of levels being larger than desired. The number of desired levels is given by the capabilities of printer 3, or by system considerations. Each pixel from IIT 1 will be processed at image processing unit (hereinafter, IPU) 2 in the manner described hereinbelow, to redefine each pixel in terms of a new, smaller set of 'd' magnitudes or levels. In this process, 'c' and 'd' are integer values representing pixel depth representing the magnitude of density. Here, color data may be represented by a number of independent channels or separations which are handled independently, or the color data might be represented as vector data in a predefined color space, e.g.: RGB, CIELab etc., being submitted to vector operations in the thresholding, error calculation and correction. One common case of this method includes the conversion of data from a relatively large set of gray level values to one of two legal or allowed bin values for printing in a binary printer 14. Another case of this is the conversion of data from a relatively large set of color data expressed as red, green and blue, or cyan, magenta, yellow and black, to one of five legal bin values for printing as described in U.S. Pat. No. 5,317,653, to Eschbach et al.

An input image of the type to be processed as hereinafter described may be represented by digital electronic signals representing gray values (gray level pixels) arranged in an array of L, lines, each line containing N gray values with depth c, with any one pixel in said array denoted by I(n,l). Gray values are typically expressed as integers, with one example falling in the range from 0 to 255, although greater or lesser number of levels, as well as non-integer representations, are possible, so that the magnitude of the electronic signals corresponds to the magnitude of the gray value. An output image is expressed as a set of electronic signals corresponding to output pixels, each output pixel corresponding to an output element that is printable by a digital printer or display. Gray does not refer to a specific color herein, but to a measurable gradation of optical density. Image input devices producing such input images may be standard black and white document scanners, such as, for example, the Pixelcraft 7650 Pro Imager scanner or the scanners included in the Xerox DocuTech Production Printing Systems, or color scanners such as the Pixelcraft 7650C Color Scanner or color scanners included in the Xerox 5775 Digital Color Copier or the Xerox 5760 and 5765 MajestiK Digital Color copiers. Each of these products has the capability of producing as a scanner response a digital electronic signal representing optical density (the gray value or pixel) of a document at a discrete location (a pixel position in an array of scan line on a page) therein.

With reference to FIGS. 2 and 3, a stored array of input image signals at input RAM 8, which may be from any image input device 1 operated in accordance with suitable driver software or computer generated representations, directs input image I into the system on a signal by signal basis, where n,e represents the position of a single image signal I(n,l) in a stream of image signals. Such gray level signals or pixels are generally defined as multi-bit or N bit values, which defines $2^N$ or 'c' possible levels of optical density. Initially, a single signal I(n,l) is stored from input RAM or other storage device 8 suitable for holding a portion of image I to an input register 10 which is a storage device suitable for storing such a multi-bit signal. Each input signal, stored at input register 10, has a corresponding error correction signal e added to the image signal I at signal adder 12 where $\epsilon(n,l)$ is a sum of weighted error term signals of previous pixels to be added to $I(n,l)$, resulting in a modified image signal. The modified image signal, the sum of the input image signal and the error correction signal of previous pixels $(I(n,l)+\epsilon(n,l))$, is passed to threshold comparator 14, where it is compared to the threshold signal T generated in accordance with the invention, to determine the corresponding output state $d_i$, where the drawing shows the case for two output states $d_1$ and $d_2$ for simplicity, although more output levels are possible. States $d_1$ and $d_2$ correspond to an appropriate output signal $B(n,l)$ for pixel $I(n,l)$, such as, for example, for a binary output printing system, a spot or no spot. Responsive to this comparison, if the signal $I(n,l)+\epsilon(n,l)$ is greater than the reference, then an image signal representing a single white spot is directed to output register 18 from RAM memory 22. If responsive to this comparison, signal $I(n,l)+\epsilon(n,l)$ is less than the reference, then an image signal representing a single black spot is directed to output register 18 from memory 20. If a black pixel is directed to output register 18, switch $S_1$ is enabled to allow the modified input image signal $I(n,l)+\epsilon(n,l)$ to be stored to error register 30 without alteration. If a white pixel is directed to output register 18, switch $S_2$ is enabled to allow the modified input image signal $I(n,e)+\epsilon(n,l)$ to be stored to error register 30, after having a value equal to white (255 in the 8 bit case) subtracted from the signal. Pixels stored to output register 18 are eventually directed to output device 3. In the present case, the printer can be any binary printer, for example the Xerox 4030 (low speed printer) or the Xerox DocuTech Model Production Printer 135 (high speed printer). In cases where I represents a single separation of an image, with or without further correlation processing, the separation may be printed at a color printer such as the Xerox 5775 Digital Color, the Xerox 4700 Color Printer, or the Hewlett Packard 1200C Ink Jet Color Printer.

Error determined in the quantization of pixels is stored at error RAM 32, until an image signal which requires the addition of error passes through the system. Then, the portion of the stored errors from previous quantization is directed to adder 50 from past error registers 52, 54, 56 and error register 30. Error registers 52, 54, 56 are connected to allow the error signal to be shifted from register to register as a line of data is directed through the described system. Error signals are directed through multipliers A, 13, C and D, respectively, in accordance with Floyd and Steinberg type error diffusion, with a weighting scheme selected as desired. Note that the use of four error signals is for illustrative purposes only and that lesser or larger numbers might be used in the actual implementation. Signal adder 50 produces signal $\epsilon(n,l)$ to be added to $I(n,I)$, resulting in a modified image signal. The modified image signal, the sum of the input image signal and the error correction signal of previous pixels is given by $(I(n,t)+\epsilon(n,l))$. Note also the weighting function described in U.S. patent application Ser. No. 08/167,758 by Shiau et al. filed Dec. 15, 1993, which could be directly substituted into this arrangement.

The principle of the invention will now be discussed. In the present invention, the error diffusion threshold signals will be generated as response for past output pixels, by "imprinting" a "signature" into the threshold for every pixel that is set in the output. This "imprint" has the effect of locally changing the probability for a black/white pixel to be set. In an intensity system, raising the threshold makes it less likely that the next pixel is white, while lowering the threshold makes it more likely that the next pixel is white, and therefore making it less likely for a black pixel to be set.

A simple way to discourage the clustering of like pixels (black or white) is to raise the threshold when a white pixel is set, and to lower the threshold when a black pixel is set. This in itself, however, is not sufficient to generate a homogeneous pulse distribution. Rather the raising or lowering of the threshold has to change the probability of black/white pixels in accordance with the local input value, i.e, a white pixel in a region of ¼ intensity should reduce the possibility of another white pixel being set for 3 neighboring pixels, and a white pixel in a region of ⅒ intensity should reduce the possibility for 10 neighboring pixels. While this simple approach has value, large areas would have to be stored during processing, with its problems of implementation.

An efficient way to generate a threshold imprint over a 2-dimensional area is to generate a 1-dimensional imprint along the scanline when the scanline is processed. When processing the next scanline, the dampened threshold array of the previous scanline is used to generate the initial threshold values for the current scanline. The dampening guarantees, that the effect of an imprint is lost/dampened over a number of scanlines, so that the relationship is given by:

$$\text{threshold}(n,l) = D \cdot \text{threshold}(n,l-)$$

where

D is the dampening coefficient

It should be noted, that this threshold array is subsequently modified during processing by the imprints generated in the current scanline.

So far, only the method of generating a 2-dimensional threshold imprint from a 1-dimensional imprint has been described, but no explanation has been given for the exact form of each individual imprint. As mentioned, it is desirable that the imprint influences a neighboring area as a function of the local intensities, i.e., an imprint for a white pixel in an area of ⅒ intensity should influence an area of 9 neighboring pixels. In order to make the imprint influence a larger or smaller area dependent on input level, one can make the size and form of the imprint be a function of intensity. Here, size refers to the physical size in pixels of the imprint and form refers to the actual form of the imprint within that size. For instance, an imprint can have a size of 10 pixels in the form of a gaussian. As an alternate method, one can make the strength of the imprint a function of the intensity, keeping size and form constant. This means that the strength of the imprint for a white pixel in an intensity of ⅒ is larger than the strength of the imprint for a white pixel at intensity ⅕. Inside the process, this is done by multiplying the imprint template by a number taken from a table that is dependent on the local intensity. For simplicity, the preferred method uses only current input intensity as indication of the local intensity. This means, that the different imprints vary in amplitude, but not in size or form.

Based on a symmetry argument, white pixels in dark regions can be treated as equivalent to black pixels in a light region, one time using the white pixel to raise the threshold to make white pixels (i.e., same pixels) less likely, the other time using the black pixel to lower the threshold to make black pixels (i.e. same pixels) less likely. For an ideal system, the strength of an imprint can be set such that the change caused by a white pixel at intensity ⅒ will be the same as the strength of an imprint caused by a black pixel at intensity 9/10, however, with different signs. In this way, only one table of imprint strengths has to be stored for both black and white imprints combined. This means:

amplitude(white,input)=-amplitude(black,max_input-input).

Some other conditions can be applied to the threshold imprint strengths:

1. The imprints should be strong in the very dark/light regions, but should vanish for mid-gray regions, where standard error diffusion techniques have good performance.

This requirement guarantees that the good performance of error diffusion in the midtones is maintained and that the modifications only take effect in the areas where error diffusion leads to a unpleasant dot structure. It is achieved by two different ways in the current implementation. First, since the imprint amplitude for a black pixel at 50% input intensity is oppositely equal to the imprint amplitude of a black pixel at 50% input intensity, the subsequent imprints cancel one another. Secondly, it is also achieved by simply using an imprint strength of "~0" in the midtones.

2. For all inputs, the threshold imprints should result in a stable 2-dimensional threshold imprint array that does not grow beyond bounds.

A simple way to guarantee the stability of the threshold imprints is to use positive and negative imprints. As an example consider a dark area with very few white pixels. At the location of the white pixel a threshold imprint is created, locally increasing the thresholds. For every black pixel generated the threshold is reduced again, using only a weak imprint, i.e. a black pixel set in a dark area will very slightly lower the threshold in the neighborhood to increase the probability of a white pixel. This bi-polar imprinting opens an easy way to guarantee stability of the threshold imprints by making the amplitudes of black pixels and white pixels in the same input intensity region functions of one another. For an intensity of 1/10, we expect 1 white pixel for every 9 black pixels. In this case, the amplitude of the imprint of an individual black pixel is 1/9th the amplitude of the imprint of an individual white pixel, again with opposing signs. For an intensity of 1/5, with 1 white and 4 black pixels, the amplitude of the black imprint is 1/4th the amplitude of the white imprint, etc. This form of bi-polar imprints introduces an additional symmetry for the imprint amplitudes namely:

$$\text{amplitude(white,input)} = -\text{amplitude(black,max\_input-input)}$$
$$= (\text{input}/(\text{max\_input-input})) \times \text{amplitude(white,max\_input-input)}$$

where the first two terms are equal based on the black/white symmetry and the last two terms are equal based on the bi-polar form of imprinting.

All other parts of the standard error diffusion algorithm remain unchanged. The examples shown use the identical error diffusion weights as suggested by Floyd and Steinberg. Also, modifications like U.S. Pat. No. 5,045,952 and others are straightforward to implement in conjunction with the invention, as are modifications of the error calculation and weight allocation taught, for example, in U.S. patent application Ser. No. 07/672,987 (with a counterpart application published in Japan at JP-A 1 4-328957), entitled "Method for Image Conversion with Application of Multiple Error Diffusion Matrices", by Eschbach, U.S. Pat. No. 4,924,322 to Kurosawa et. al., U.S. Pat. No. 4,339,774 to Temple, U.S. Pat. No. 4,955,065, to Ulichney and U.S. patent application Ser. No. 08/167,758 by Shiau et al.

Returning to FIGS. 2 and 3, neighborhood density measurement 60, produces a measurement of image density over an area of the image and operates on measured density to produce a signal A(n,l) reflecting how strongly the threshold will be changed. For simplicity, this area can be optionally reduced to encompass only the current pixel.

At imprint amplitude LUT 70, the signal A(n,l) is used, together with the signal from output register 18 as an index to a table of imprint amplitude values to generate an amplitude signals amp(n,l). No doubt it will be understood that this table could be combined within a table provided for the generation of the signal A(n,l). The arrangement has the ability to take advantage of the fact that there is symmetry in imprint amplitude based on whether output pixel B(n,l) is white or black. Thus, the function block labeled imprint amplitude LUT 70 may include input amplitudes for white pixels, with an arithmetic operating circuit that takes the output of the LUT and converts the white amplitude values to black amplitude values according to the function:

amp(white,input)=-amp(black, max_input-input) where white and black represent the state of the input pixel. Imprint amplitude LUT 70 also enables a non-symmetric implementation in cases where this is deemed preferred for the output device.

At imprint LUT 80, imprints are stored for use in the system. Typically, there will be a series of digitally stored values that determine the form of the actual imprint by giving the relative imprint amplitude levels along with an indication of the imprint center:

Template: {0.05, 0.25, 0.55, 0.75, 0.9, 1.0, 1.1, 1.0, 0.75, 0.55, 0.25, 0.05} where 1.1 is the center pixel. Several different implementations can be used to define the imprint center pixel. In symmetric imprints, the first pixel can be designated center pixel and out previous template would be stored Template: {1.1, 1.0, 0.75, 0.55, 0.25, 0.05}In such a case, all pixels (n+i, l) with positive indices i are taken directly from the table, whereas all pixels (n+i,l) with negative indices i use the absolute value of i as an index into the table.

An alternate method is to designate a specific table value to define the center of the imprint. Using a designated value of 1.0 for the center, the original template rounded to two decimals would be stored as:

Template: {0.05, 0.23, 0.5, 0.68, 0.82, 0.91, 1.0, 0.91, 0.82, 0.68, 0.5, 0.23, 0.05}

Another alternate method would use the center pixel of the imprint LUT as the center of the imprint.

Signals obtained from imprint LUT 80 are multiplied by signals from the imprint amplitude LUT 70, at signal multiplier 90, to produce threshold correction signals $T_i$. Signals $T_i$ are added to the threshold signals T'(n,l) in threshold array 100.

Threshold Array RAM 100 is initially cleared and the first pixel threshold T(1,1) is generated by adding the threshold to the first element of the threshold array T'(1,1) RAM 100 to the initial threshold $T_{start}$ from RAM 110 at adder 112. The first output pixel B(1,1) is generated using threshold T(1,1), setting the output register 18. In response to imprint amplitude LUT 70, an imprint is generated via imprint LUT 80 and multiplier 90, changing the first element of the threshold array T'(1,1). Assuming, for illustrative purposes, the threshold imprints $T_i = T_{-2}, T_{-1}, T_0, T_1, T_2$, the first threshold element T'(1,1) of threshold array RAM 100 is changed to T'(1,1)=$T_0$, the second element T'(2,1) is changed to T'(2,1)=$T_1$, etc. The threshold for the second input pixel T(2,1) is then calculated as T(2,1)=$T_{start}$+T'(2,1)=$T_{start}$+$T_1$. This threshold T(2,1) is used to generate the second output pixel B(2,1). In response to the second output pixel B(2,1) new imprint amplitudes $U_i$ are generated at LUT 70. Assuming, for illustrative purposes, the threshold imprints $U_i$=$U_{-}$ $2, U_{-1}, U_0, U_1, U_2$, and the threshold RAM 100 is changed by changing T'(1,1) to T'(1,1)=$T_0$+$U_{-1}$, T'(2,1) to T'(2,1)=$T_1$+$U_0$, and T'(3,1) to T'(3,1)=$T_2$+$U_1$, etc. The new threshold for input pixel I(3,1) is then calculated as T(3,1)=$T_{start}$+ T'(3,1).

After completion of the scan line threshold array RAM 100 is loaded with the initial thresholds for the new scanline. In a simple implementation, the new threshold values T'(n+1,i) are derived via T'(n+1,i) =D×T'(n,i). Note that the physical memory size for this operation needs only to encompass one scanline, making it possible for T'(n+1,i) and T'(n,i) to use the same RAM.

In an alternate implementation, the initial thresholds for the new scanline are formed as a weighted sum of the final thresholds of the previous scanline, T'(n+1,i)=T'(n,i)+a T'(n, i−1)+bT'(n,i+1)+. +.

Figure 4A:
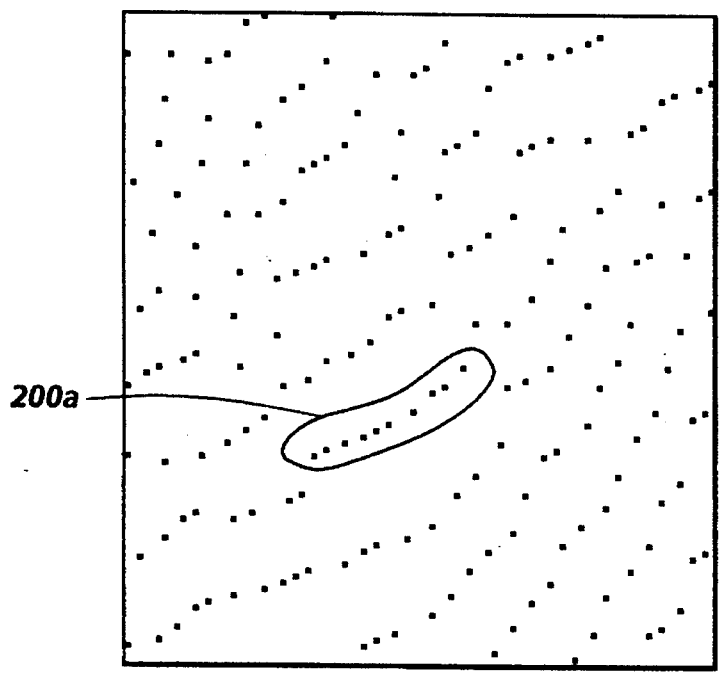
FIGS. 4A and 4B show an example output of standard error diffusion, compared to the output of the present invention.
Figure 4B:
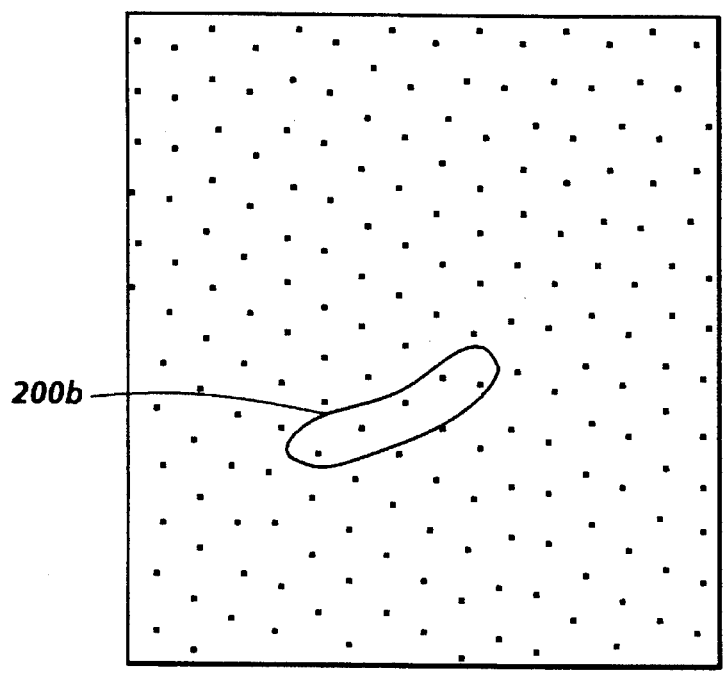

FIG. 4 shows a comparison of the dot-structures achieved with the described invention and standard error diffusion. FIG. 4A shows the case of the output dot structure of an input of constant value 250 (out of 255 levels) using error diffusion with the original Floyd and Steinberg weights. Note particularly the worming indicated in area 200b FIG. 4B shows the output pattern for the same input using the relative threshold imprint amplitudes given on page 13, an absolute threshold imprint amplitude of 150 (out of 255) and a dampening coefficient of 0.8. Note the absence of the strong worm in the area 200a, and strong worming in general.

It will be appreciated by those of skill in the art that changing the threshold against which the modified image signal is compared is completely equivalent to adding the threshold value to the modified signals, and comparing the modified signal to a fixed threshold. Such an arrangement is well within the scope of the invention.

It will no doubt be appreciated that the present invention may be accomplished with either software, hardware or combination software hardware implementations. Additionally, it will be recognized that the invention has application in both standard and high addressability digital printing systems.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. A processing system for preparing an image derived originally with a device describing each image signal in terms of c levels, for output to an output device responding to output signals having d levels, where c>d>1 comprising:

an image generator, producing an input set of image signals representing optical density at discrete points therein, said input signals having magnitudes varying over c levels;

a signal adder having as inputs an image signal from the input set, and modifying the image signals with a previously determined error signal derived by processing previous input signals, if any;

a threshold comparator comparing each modified input signal with at least one reference signal to determine which of 'd' possible output signals best represents the modified input signal;

an output device, responsive to said output signals to reproduce the image in accordance therewith;

a difference circuit determining the difference between the determined output signal and the modified input signal, and generating at least one error signal responsive indicative thereof; and a reference signal generator producing reference signals for each input signal, including
 a) an intensity measurement circuit measuring intensity in an area including the input signal, and producing an intensity measurement signal indicative of measured intensity;
 b) a memory, storing threshold imprint values, and outputting said values responsive to said intensity measurement signal and at least one previous output signal, if any;
 c) a reference memory array, storing a set of reference signals for a previous scan line, updated by combining a stored reference signal and imprint signal to generate a reference signal for the image signal, and directing said reference signals to the threshold comparator;
 d) a threshold decay signal processor reducing the value of the reference signal stored in the threshold memory array after it is used at the threshold comparator.

2. A processing system for preparing an image derived originally with a device describing each image signal in terms of c levels, for output to an output device responding to output signals having d levels, where c>d>1 comprising:

an image generator, producing an input set of image signals representing optical density at discrete points therein, said input signals having magnitudes varying over c levels;

a signal adder having as inputs an image signal from the input set, and modifying the image signals with a previously determined error signal derived by processing previous input signals, if any;

a threshold comparator comparing each modified input signal with at least one reference signal to determine which of 'd' possible output signals best represents the modified input signal;

an output device, responsive to said output signals to reproduce the image in accordance therewith;

a difference circuit determining the difference between the determined output signal and the modified input signal, and generating at least one error signal responsive indicative thereof; and a reference signal generator producing reference signals for each input signal, including
 a) an intensity measurement circuit measuring intensity in an area including the input signal, and producing an intensity measurement signal indicative of measured intensity;
 b) an amplitude memory, storing amplitude values, and outputting said amplitude values responsive to said intensity measurement signal and at least one previous output signal, if any;
 c) an imprint memory, storing a set of imprint values defining a relationship between a set of reference signal modifications to be applied to the reference signals for each of a group of successive image signals in a single scan line;
 d) a signal processor, combining an imprint value from the imprint memory for the image signals and the amplitude value for the image signal, to generate an imprint signal therefor;
 e) a reference memory array, storing a set of reference signals for a previous scan line, updated by combining a stored reference signal and the imprint signal to generate a reference signal for the image signal, and directing said reference signals to the threshold comparator;

f) a threshold decay signal processor reducing the value of the reference signal stored in the threshold memory array after it is used at the threshold comparator.

3. The device as defined in claim 2, where the area over which the intensity measurement signal is derived includes only the pixel under operation.

4. The device as defined in claim 2, where said image signals are derived by a scanner, producing digital signals indicative of sensed reflected light from an illuminated sheet of image supporting material.

5. The device as defined in claim 2, where said output device is a printer, producing marks of a page of image supporting material responsive to receiving said output signals.

6. The device as defined in claim 2 wherein said intensity measurement circuit is operative over a plurality of image signals surrounding and including the image signal to be processed.

7. The device as defined in claim 2 wherein said amplitude memory is a lookup table stored in RAM memory.

8. The device as defined in claim 2 wherein said imprint memory is a lookup table stored in RAM memory.

9. The device as defined in claim 2 wherein said signal processing is a multiplier, receiving as inputs the imprint value and the amplitude value.

10. The device as defined in claim 2 wherein the threshold memory array, is updated by adding the imprint signal to a corresponding stored reference signal.

11. The device as defined in claim 2 wherein the threshold decay signal processor multiplied the value of the reference signal stored in the threshold memory array by a predetermined decay value after the completion of each scan line of processing, where decay value <1.

12. The device as defined in claim 2 wherein, for a new, unprocessed image, the reference signal is arbitrarily set to $T_{start}$ prior to the start of processing any image signals, and every location in the threshold memory array is set to zero.

13. A document processing system for preparing a document derived originally with a device describing each signal in terms of c levels, for output to an output device responding to signals having d levels, comprising:

a document image creator, producing a set of input signals representing optical density at discrete points within a document, said input signals having magnitudes varying over c levels;

means for adding a previously determined error signal derived by processing previous input signals, if any, to said input signal;

means for comparing each modified input signal with at least one reference signal to determine which of d printer output signals best represents the modified input signal;

a printer, responsive to said printer output signals reproduce the document in accordance therewith;

means for determining the difference between the determined printer output signal and the modified input signal, and generating at least one error signal responsive indicative thereof;

means for producing a reference signal for each input signal, said means responsive to a) intensity measurement means measuring intensity in an area adjacent the input signal, and producing an intensity measurement signal indicative of measured intensity;

b) an amplitude memory means storing amplitude values, and outputting said amplitude values responsive to said intensity measurement signal and at least one previous output signal, if any;

c) an imprint memory means storing a set of imprint values defining a relationship between a set of reference signal modifications to be applied to the reference signals for each of a group of successive image signals in a single scan line;

d) a signal processor means combining an imprint value from the imprint memory for the image signals and the amplitude value for the image signal, to generate an imprint signal therefor;

e) a threshold memory array means storing a set of reference signals for a previous scan line, updated by combining a stored reference signal and the imprint signal to generate a reference signal for the image signal, and directing said reference signals to the threshold comparator;

f) a threshold decay signal processor means reducing the value of the reference signal stored in the threshold memory array after it is used at the threshold comparator.

14. The device as defined in claim 13, where the area over which the intensity measurement signal is derived includes only the pixel under operation.

15. The device as defined in claim 13, where said document image creator is a scanner producing image signals indicative of sensed reflected light from an illuminated sheet of image supporting material.

16. The device as defined in claim 13 wherein said intensity measurement means is operative over a plurality of image signals surrounding and including the image signal to be thresholded.

17. The device as defined in claim 13 wherein said amplitude memory means is a lookup table stored in RAM memory.

18. The device as defined in claim 13 wherein said imprint memory means is a lookup table stored in RAM memory.

19. The device as defined in claim 13 wherein said signal processor means is a multiplier, receiving as inputs the imprint value and the amplitude value.

20. The device as defined in claim 13 wherein the threshold memory array means, is updated by adding the imprint signal to a corresponding stored reference signal.

21. The device as defined in claim 13 wherein the threshold decay signal processor means multiplied the value of the reference signal stored in the threshold memory array means by a predetermined decay value after the completion of each scan line of processing, where decay value<1.

22. The device as defined in claim 13 wherein, for a new, unprocessed image, the reference signal is arbitrarily set to $T_{start}$ prior to the start of processing any image signals, and every location in the threshold memory array means is set to zero.

23. A method for preparing an image derived originally with a device describing each image signal in terms of c levels, for output to an output device responding to output signals having d levels, where c>d>1 comprising:

receiving an input set of image signals representing optical density at discrete points therein, said input signals having magnitudes varying over c levels;

modifying each image signal in the input set in accordance with a previously determined error signal derived by processing previous input signals, if any;

comparing each modified input signal with at least one reference signal to determine which of 'd' possible output signals best represents the modified input signal;

directing said output signals to an output device to reproduce the image in accordance therewith;

determining the difference between the determined output signal and the modified input signal, and generating at least one error signal responsive indicative thereof;

producing reference signals for each input signal, by
a) measuring intensity in an area of the image adjacent the input signal, and producing an intensity measurement signal indicative of measured intensity;
b) storing amplitude values, and outputting said amplitude values responsive to said intensity measurement signal and at least one previous output signal, if any;
c) storing a set of imprint values defining a relationship between a set of reference signal modifications to be applied to the reference signals for each of a group of successive image signals in a single scan line;
d) combining an imprint value from the imprint memory for the image signals and the amplitude value for the image signal, to generate an imprint signal therefor;
e) storing a set of reference signals for a previous scan line, updated by combining a stored reference signal and the imprint signal to generate a reference signal for the image signal, and directing said reference signals to the threshold comparator;
f) reducing the value of the reference signal stored in the threshold memory array after it is used at the comparison step.

* * * * *